United States Patent
Curtin, Sr. et al.

(10) Patent No.: US 6,530,127 B2
(45) Date of Patent: Mar. 11, 2003

(54) RESTRAINT DEVICE WITH RELEASE MECHANISM

(76) Inventors: John W. Curtin, Sr., 9232 Beauclerc Wood La. S., Jacksonville, FL (US) 32257; David F. Gramenz, 6565 Craig Ave., Inver Grove Heights, MN (US) 55076

( * ) Notice: Subject to any disclaimer, the term of this patent is extended or adjusted under 35 U.S.C. 154(b) by 0 days.

(21) Appl. No.: 09/881,203

(22) Filed: Jun. 15, 2001

(65) Prior Publication Data

US 2002/0026692 A1 Mar. 7, 2002

Related U.S. Application Data

(60) Provisional application No. 60/211,465, filed on Jun. 15, 2000.

(51) Int. Cl.[7] .............................................. A44B 21/00
(52) U.S. Cl. ................................. 24/68 CT; 24/68 CD; 24/69 CT; 24/265 CD; 24/116 R; 410/100
(58) Field of Search ...................... 24/68 CT, 69 CT, 24/265 CD, 69 T, 69 WT, 68 CD, 116 R, 909, 265 AL, 68 R; 410/110, 105

(56) References Cited

U.S. PATENT DOCUMENTS

| 159,057 | A | * | 1/1875 | Ackerman | 144/25 |
|---|---|---|---|---|---|
| 618,187 | A | * | 1/1899 | Rhodes | 140/102.5 |
| 2,363,138 | A | * | 11/1944 | Moore | 24/909 |
| 2,903,767 | A | | 9/1959 | Huber | 24/116 |
| 4,221,364 | A | * | 9/1980 | Nishimura | 24/116 R |
| 4,273,486 | A | * | 6/1981 | Tatina | 24/116 R |
| 4,437,623 | A | * | 3/1984 | Wyder | 242/381.1 |
| 4,622,721 | A | * | 11/1986 | Smetz et al. | 24/68 CD |
| 5,542,798 | A | * | 8/1996 | Rawdon et al. | 24/68 CD |
| 5,692,269 | A | * | 12/1997 | Kampes | 24/68 CD |
| 5,855,045 | A | * | 1/1999 | Miura | 24/68 CD |
| 5,920,962 | A | * | 7/1999 | Franklin | 24/116 R |
| 6,178,603 | B1 | * | 1/2001 | Lillig | 24/132 R |
| 6,193,454 | B1 | * | 2/2001 | Alegre | 410/100 |

* cited by examiner

Primary Examiner—Robert J. Sandy
Assistant Examiner—Andre L. Jackson
(74) Attorney, Agent, or Firm—Finnegan, Henderson, Farabow, Garrett & Dunner, L.L.P.

(57) ABSTRACT

A restraint device is provided for releasably securing a load in place on a support surface by creating a force in a tensioning line, such as a chain. The restraint device is connected between the load and the support surface. The restraint device includes a rotatable line support member mounted on a support frame. The line support member includes toothed ratchet wheels and a chain bed for receiving the chain. The chain bed is provided with a line-engaging surface which engages the chain and prevents motion of the chain relative to the chain bed. A force can be applied to the chain manually to secure the load. A retention member engages the teeth of the ratchet wheels and prevents motion of the wheels in a loosening direction. A release member disengages the retention member from the ratchet wheels and allows the force in the chain to be quickly released.

25 Claims, 12 Drawing Sheets

RESTRAINT DEVICE WITH RELEASE MECHANISM

This application claims the benefit of provisional application Ser. No. 60/211,465 filed Jun. 15, 2000.

BACKGROUND OF THE INVENTION

1. Field of the Invention

The present invention relates to a restraint device for securing a load in place with respect to a support surface by creating a force in a tensioning line, and more particularly to a device in which the force in the tensioning line can be created manually and quickly released.

2. Description of the Related Art

Restraint devices providing a releasable force to secure a load in place are known in the art. An example of such a device is a heavy equipment tie-down device used to secure vehicles within the cargo space of an aircraft or to the deck of a ship. A restraint device of this type is disclosed in U.S. Pat. No. 2,903,767 to Huber. In this device, tension is created in a chain by the insertion of a chain link in a shaped pocket and the actuation of a locking handle, followed by the rotation of a threaded collar.

There are a number of problems associated with conventional tie-down devices. Because of the in-line arrangement of the chain securing member, precise placement of the chain within the shaped pocket is required. If the chain is not properly installed, the holding strength of the device is reduced. Further, to secure the chain once the desired tension is reached, the threaded collar must be aligned and rotated into position. The multiple steps involved increase both the time required to secure a load, and the likelihood of operator error.

Finally, conventional devices require special equipment to operate, such as a chain or other securing line having a non-standard shape. Accordingly, this additional requirement limits the versatility of the devices and increases equipment costs.

SUMMARY OF THE INVENTION

To overcome the drawbacks of the prior art and in accordance with the purpose of the invention, as embodied and broadly described herein, one aspect of the invention provides a restraint device including a frame, a load attachment member secured to the frame, and a line support member rotatably supported on the frame. A retention member is engageable with the line support member to prevent rotation of the line support member in one direction and a release member controls the engagement of the retention member with the line support member.

In another aspect, the invention provides a restraint device for releasably securing a load, the restraint device including a frame, a load attachment member disposed on the frame adapted to engage the load, and a line support member disposed on the frame adapted to support a tensioning line, wherein the line support member is rotatable in a first direction and a second direction. A retention member is engageable with the line support member to prevent rotation of the line support member in the second direction and a release member is actuable to move the retention member into and out of engagement with the line support member.

In a further aspect, the invention provides a restraint device for releasably securing a load by creating a force in a tensioning line extending between a support surface and the load. The restraint device includes a frame, a load attachment member secured to the frame adapted to engage the load, and a line support member supported on the frame adapted to support the tensioning line, wherein the line support member is rotatable in a tightening direction and a loosening direction. A retention member is engageable with the line support member to prevent rotation of the line support member in the loosening direction. Further, a release member supports the retention member, wherein the release member is movable between a first position, in which the retention member engages the line support member, and a second position, in which the retention member disengages from the line support member.

Additional advantages of the invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION OF THE INVENTION

Reference will now be made in detail to the present embodiments of the invention, example of which are illustrated in the accompanying drawings. Wherever possible, the same reference numbers will be used throughout the drawings to refer to the same or like parts.

Figure 1:
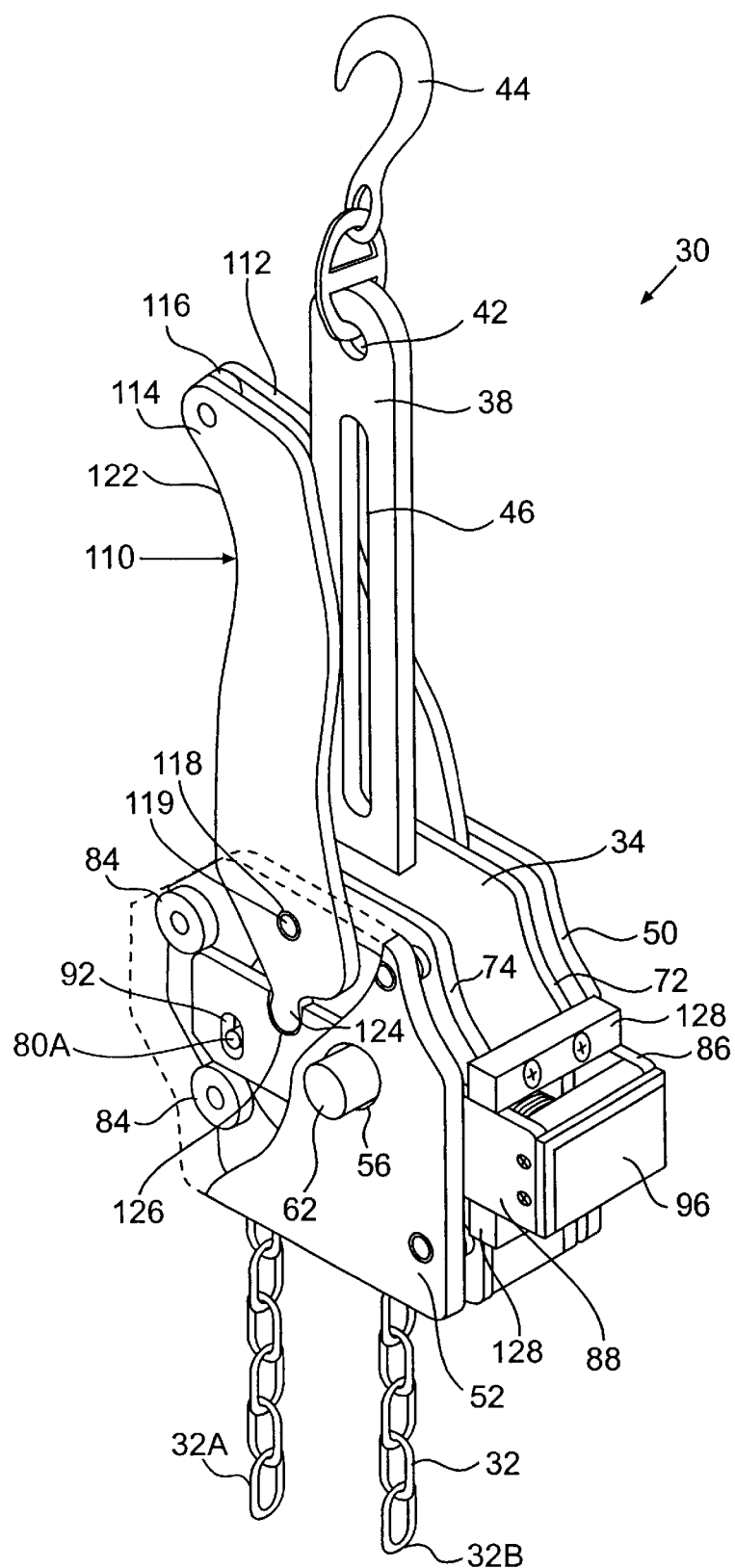
FIG. 1 is an isometric view of the restraint device of the present invention.

The restraint device 30 of the present invention, shown in FIG. 1, provides a means to releasably secure a load in place on a support surface by creating a force in a tensioning line 32 extending between the load and the support surface. Using the restraint device 30, a securing force in the tensioning line 32 can be applied manually and automatically maintained. Further, with the device 30 of the present invention, the securing force can be quickly released when desired. The restraint device 30 utilizes a commonly available tensioning line 32, such as a chain. Applications of the restraint device 30 of the present invention include securing loads in transport vehicles, including trucks, ships, and aircraft, and providing tension to tent supports or athletic nets.

Figure 2:
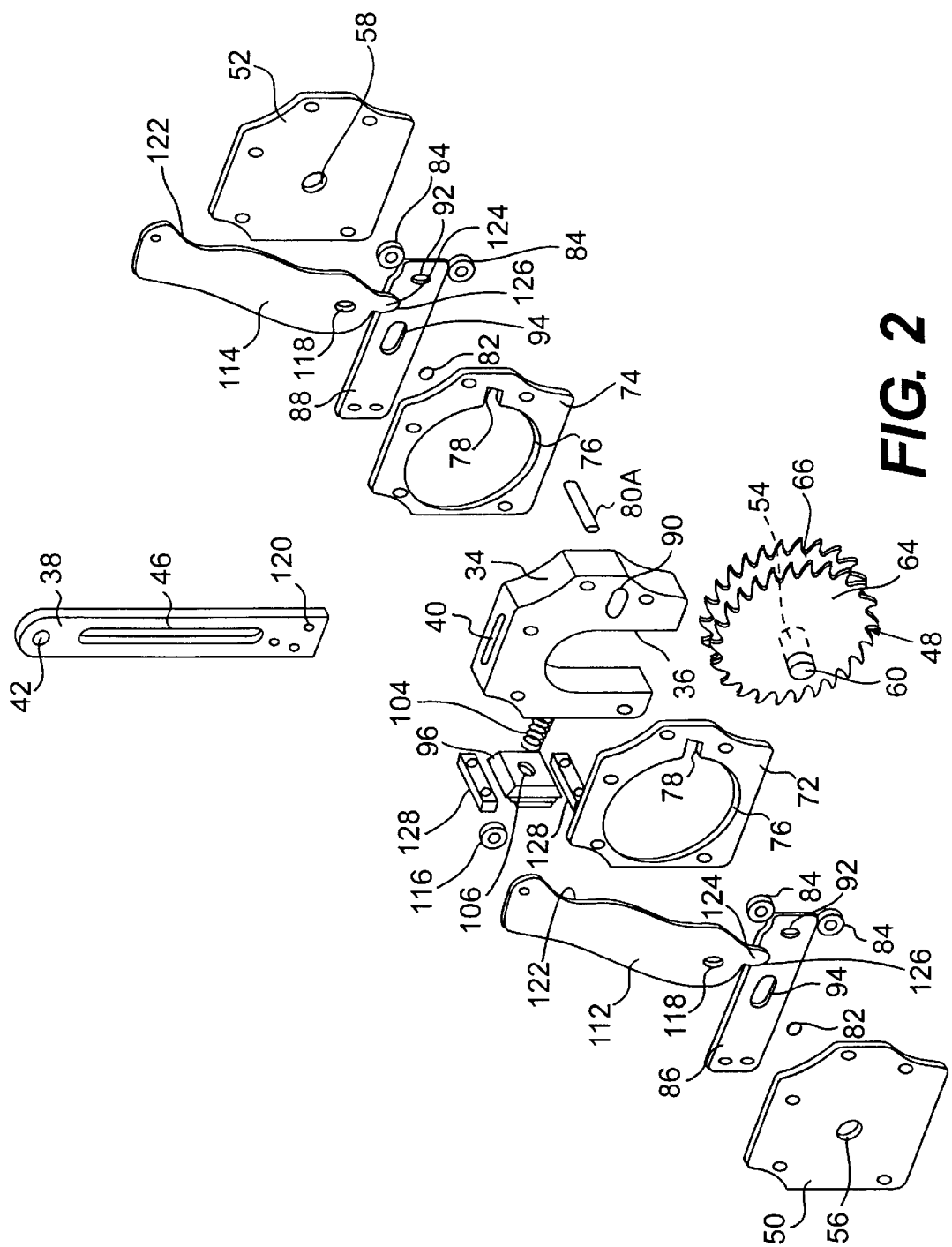
FIG. 2 is an exploded view of the restraint device of FIG. 1.
Figure 3:
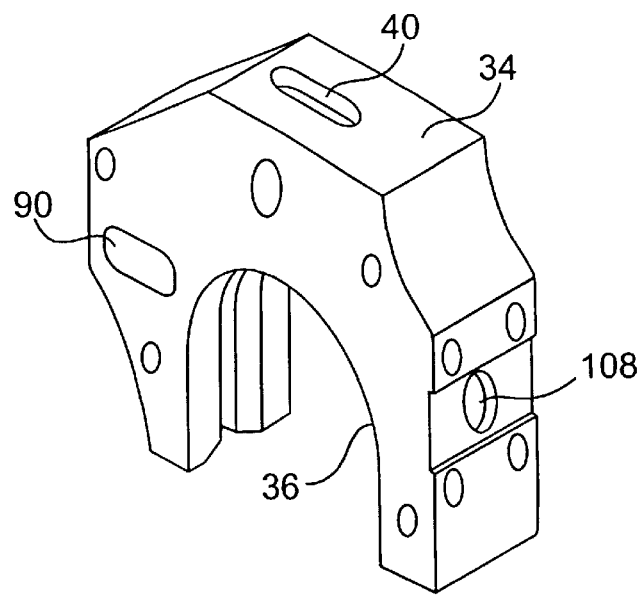
FIG. 3 is a detail view of one embodiment of the support frame of the present invention.

A description of one embodiment of the restraint device 30 of the present invention will be provided with reference to FIG. 2. As shown, the restraint device 30 is formed around a substantially U-shaped support frame 34 with a central opening 36. One embodiment of the support frame 34 is shown in FIG. 3.

An elongated load attachment member 38 has a first end secured to the support frame 34 on a surface opposite the opening 36. As shown in FIGS. 1 and 2, the load attachment member 38 can be received in a slot 40 in the support frame 34 and bolted in place. Other equivalent attachment means are considered within the scope of the invention.

The load attachment member 38 has an orifice 42 at a second end for accommodating a hook 44, or other releasable attachment means, to connect to the load to be secured. FIG. 1 shows a hook 44 disposed in the orifice 42. The load attachment member 38 can be formed with a central slot 46, shown in FIGS. 1 and 2, for weight reduction purposes.

Figure 4:
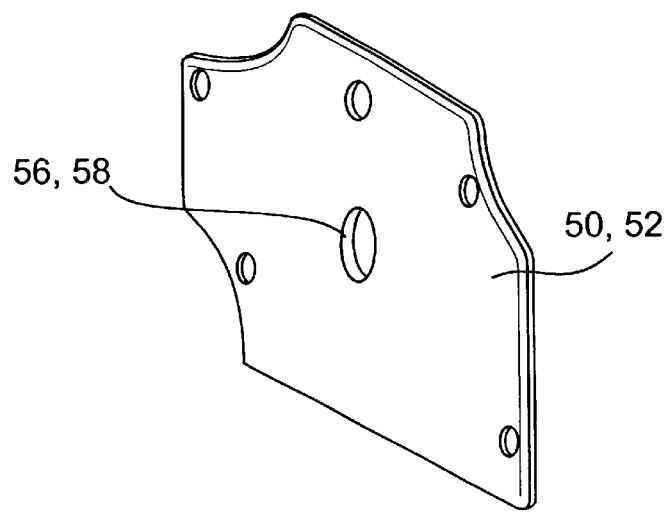
FIG. 4 is a detail view of an end plate of the present invention.

A line support member 48 is arranged within the opening 36 of the support frame 34, as shown in FIGS. 1 and 2, and held in place by a pair of end plates 50, 52. The end plates 50, 52 are shown in FIGS. 1, 2, and 4. An axle 54 of the line support member 48 passes through openings 56, 58 in the end plates. Hubs 60, 62 on the ends of the axle 54 secure the line support member 48 in place. The line support member 48 is free to rotate about the axle in first and second directions, corresponding to tightening and loosening directions of the tensioning line 32, as described below.

Figure 5:
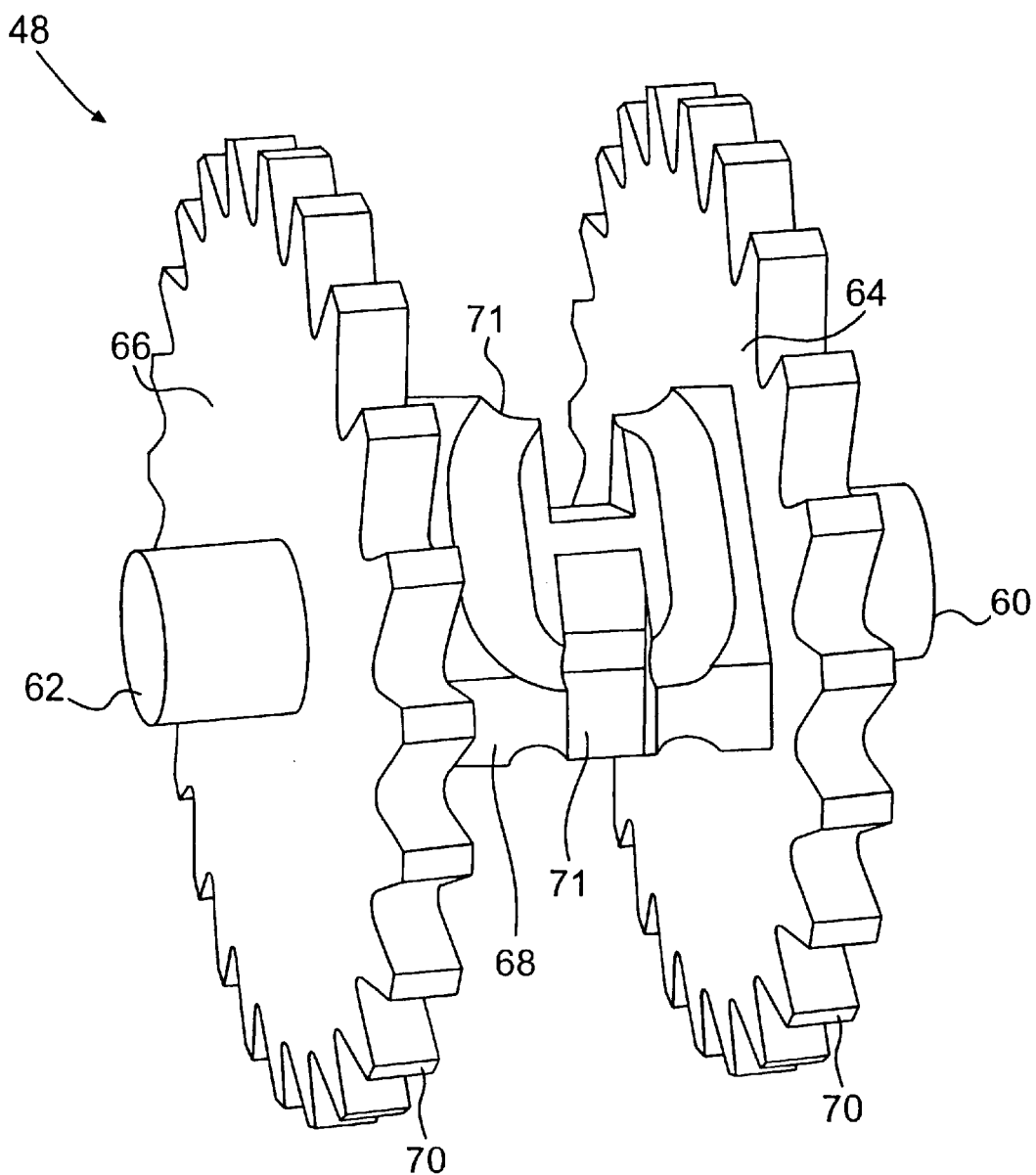
FIGS. 5 and 6 are detail views of the line support member of the present invention.
Figure 6:
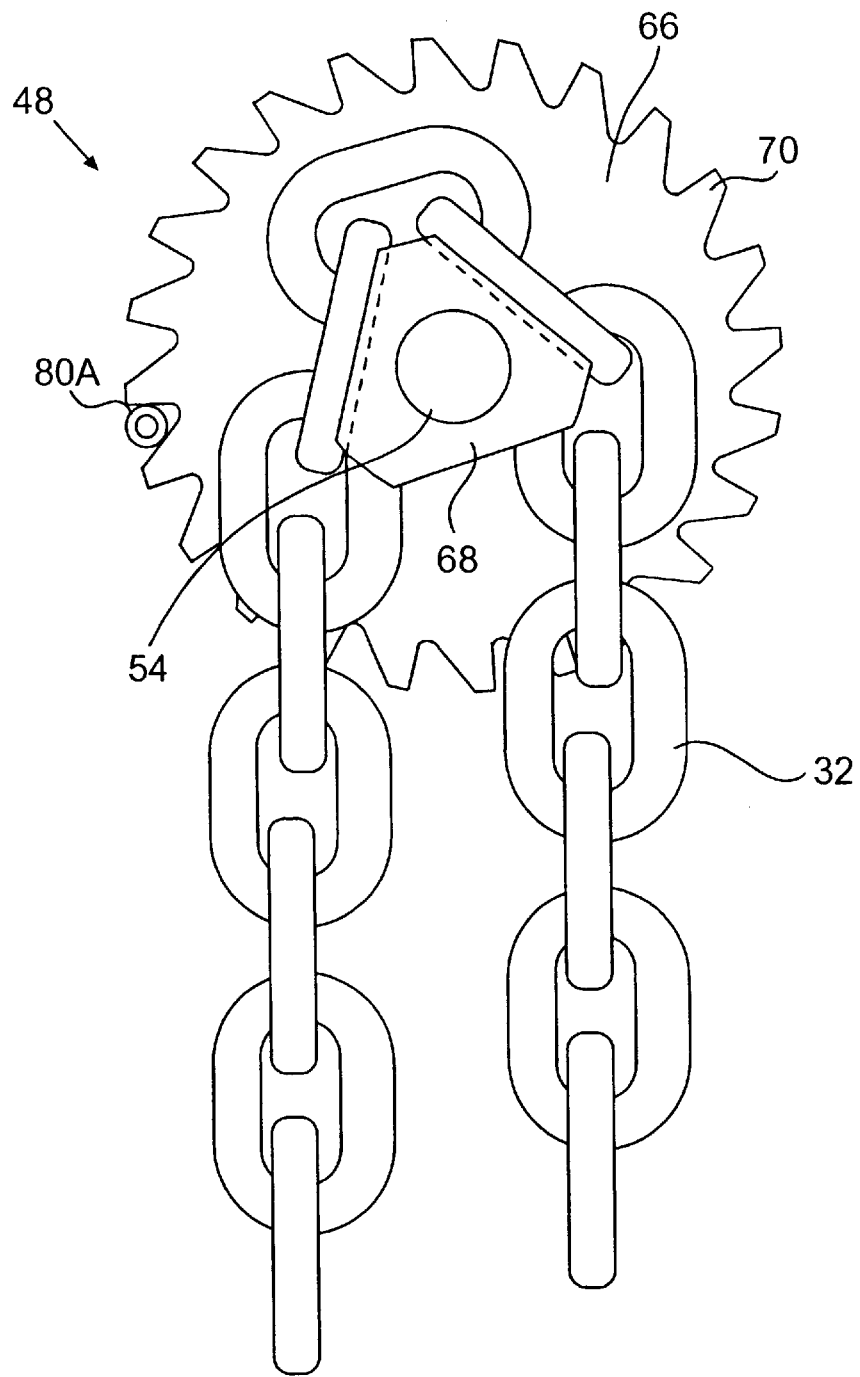

The line support member 48 is shown in greater detail in FIGS. 5 and 6. As shown, the line support member 48 has two toothed ratchet wheels 64, 66 secured to a central hub, or chain bed 68. Each ratchet wheel 64, 66 has a plurality of teeth 70 disposed on its circumference. The chain bed 68 has a multifaceted cross-section. Each face of the chain bed 68 has a chain-receiving feature that prevents motion of the chain 32 relative to the chain bed 68. In the embodiment shown, the chain-receiving feature is a machined surface with recesses 71 that correspond in shape to the links of the chain 32. When a chain 32 is placed around the chain bed 68, the chain links will automatically seat in the recesses 71. The chain bed 68 is illustrated as having three sides, but chain beds with a different number of sides are considered within the scope of the invention.

Figure 7:
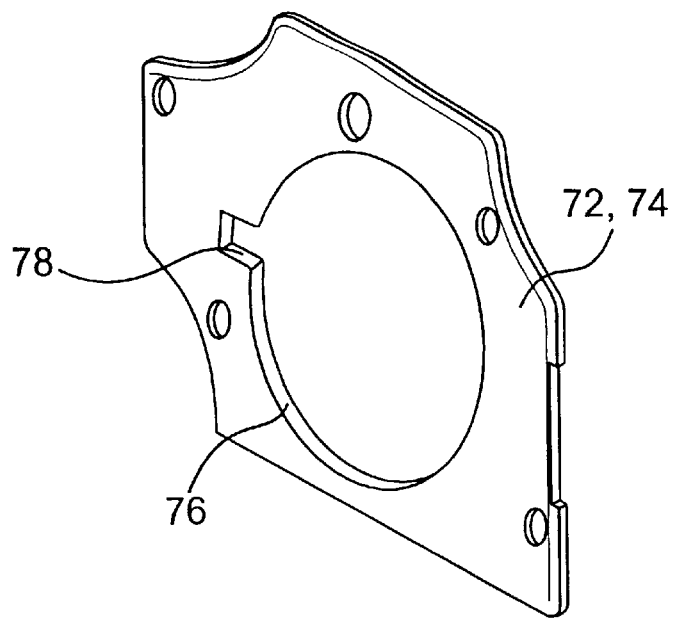
FIG. 7 is a detail view of one embodiment of the support plate of the present invention.

A support plate 72, 74 is mounted on each side of the support frame 34 between the support frame 34 and a corresponding end plate 50, 52, as shown in FIG. 2. In one embodiment, shown in FIG. 7, each support plate 72, 74 has a central opening 76 with a cutout 78 along an edge of the opening 76. The cutout 78 accommodates a retention member 80, as described below. FIG. 1 shows the support plates 72, 74 assembled to the restraint device 30.

Figure 8:
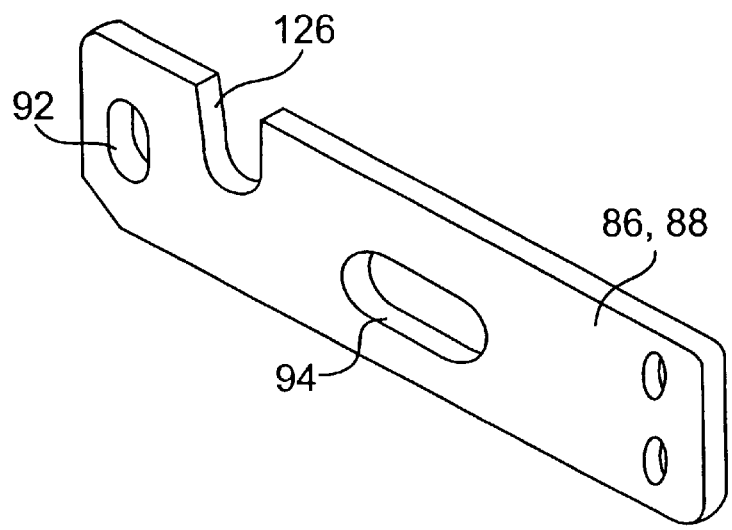
FIG. 8 is a detail view of one embodiment of the slider of the present invention.

The support plates 72, 74 provide a mounting surface for spacers 82 and guide spacers 84, which maintain a gap between each support plate 72, 74 and end plate 50, 52 sufficient to accommodate a release slider 86, 88. One embodiment of a release slider 86, 88 is shown in FIG. 8. Release sliders 86, 88 are shown mounted on respective support plates 72, 74 in FIG. 1. The release sliders 86, 88 form a portion of a release member used to manipulate a retention member 80, which can be engaged with the ratchet wheels 64, 66 to prevent their rotation in the second direction, as described below.

In one embodiment, the retention member 80 is a cylindrical pawl 80A disposed in an elongated pawl orifice 90 on the support frame 34, shown in FIG. 1. The pawl orifice 90 extends in a substantially radial direction to allow for radial motion of the pawl 80A with respect to the ratchet wheels 64, 66. The pawl 80A passes through the cutout 78 of each support plate 72, 74 and extends into a first slot 92 on a first end of each release slider 86, 88, shown in FIGS. 1, 2, 8. The first slots 92 are substantially perpendicular to the pawl orifice 90 on the support frame 34 to allow for limited motion of the pawl 80A in a direction tangential to the ratchet wheels 64, 66. The end plates 50, 52 retain the pawl 80A within the restraint device 30.

The release sliders 86, 88 each have a second slot 94 to accommodate the hubs 60, 62 on the axle of the line support member 48. The release sliders 86, 88 are guided in a linear path between a first position and a second position by the second slots 94 and by the guide spacers 84 shown in FIGS. 1 and 2. When the sliders 86, 88 are in the first position, the pawl 80A engages the ratchet wheels 64, 66. When the sliders 86, 88 are in the second position, the pawl 80A disengages from the ratchet wheels 64, 66, as described below.

The pawl orifice 90 and first slots 92 are sized to accommodate pawls of various sizes. A larger, heavier pawl has a higher strength and a decreased actuation resistance. Such a pawl would be desirable for applications involving heavy loads, while a smaller pawl would be more suitable for uses requiring lower force levels. The restraint device 30 of the present invention allows a user to select and install a pawl sized appropriately for each application.

Figure 9:
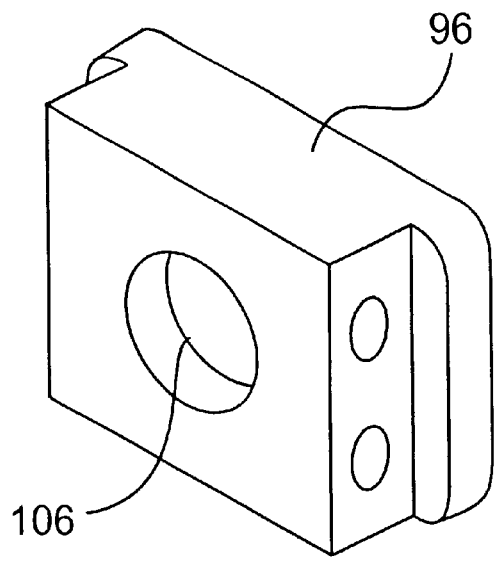
FIG. 9 is a detail view of one embodiment of the release plate of the present invention.
Figure 10:
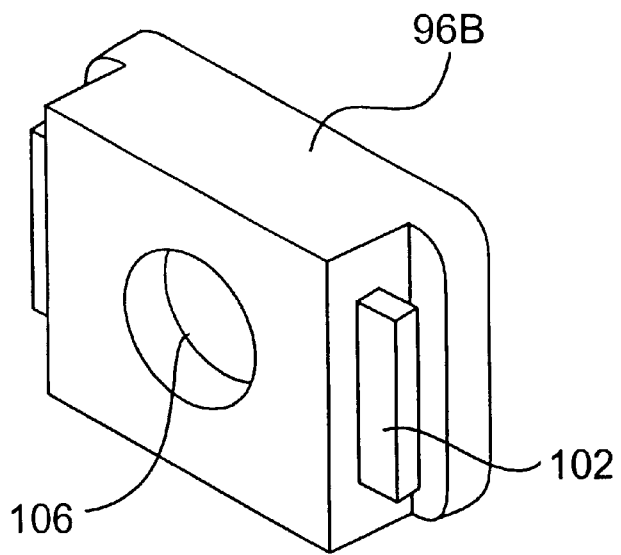
FIG. 10 is a detail view of another embodiment of the release plate of the present invention.

Each release slider 86, 88 is attached at its second end to a release plate 96, as shown in FIG. 1. One embodiment of the release plate 96 is shown in FIG. 9. In this embodiment, each release slider 86, 88 is connected to the release plate 96 with fasteners. In an alternative embodiment, shown in FIG. 10, the sliders 86, 88 and the release plate 96B are connected using mating slots 100 and projections 102. Other equivalent attachment means are considered within the scope of the invention.

A spring 104 is disposed between the release plate 96 and the support frame 34, as shown in FIG. 2. The release plate 96 and the support frame 34 are each provided with a seat 106, 108 to retain the spring 104. The spring 104 acts to bias the release plate 96 and sliders 86, 88 away from the support frame 34 towards the first position, in which the pawl 80A is engaged with the teeth 70 of the ratchet wheels 64, 66.

A release handle 110, having a right release element 112 and a left release element 114, is pivotably disposed on the support frame 34, as shown in FIG. 1. The release elements 112, 114 are connected by a spacer 116. Each release element 112, 114 has a pivot opening 118, which interacts with a corresponding pivot pin 119, shown in FIG. 1. The pivot pin passes through a pivot opening 120 in the load attachment member 38 and allows the release handle 110 to pivot with respect to the support frame 34. The pivot pin 119 also secures the release elements 112, 114 together to form the release handle 110.

Each release element 112, 114 is formed with a gripping portion 122 at a first end and a release cam 124 at a second end. The gripping portions 122 facilitate manual grasping of the release handle 110 to pivot the handle 110 in a release direction. Actuation of the release handle 110 moves the release sliders 86, 88 and release plate 96 from the first position to the second position. The release cams 124 interact with corresponding recesses 126 on each release slider 86, 88, as shown in FIG. 1, to transform the pivoting motion of the release handle 110 into linear motion of the release sliders 86, 88.

The motion of the release sliders 86, 88 is constrained by the axle hubs 60, 62 in respective second slots 94, and by the guide spacers 84 acting on the outer surfaces of the first ends of the release sliders 86, 88. Guide blocks 128, shown in FIGS. 1 and 2, further act to constrain the motion of the sliders 86, 88 and release plate 96 by limiting the deflection of the assembly as it moves to the second position.

Figure 11:
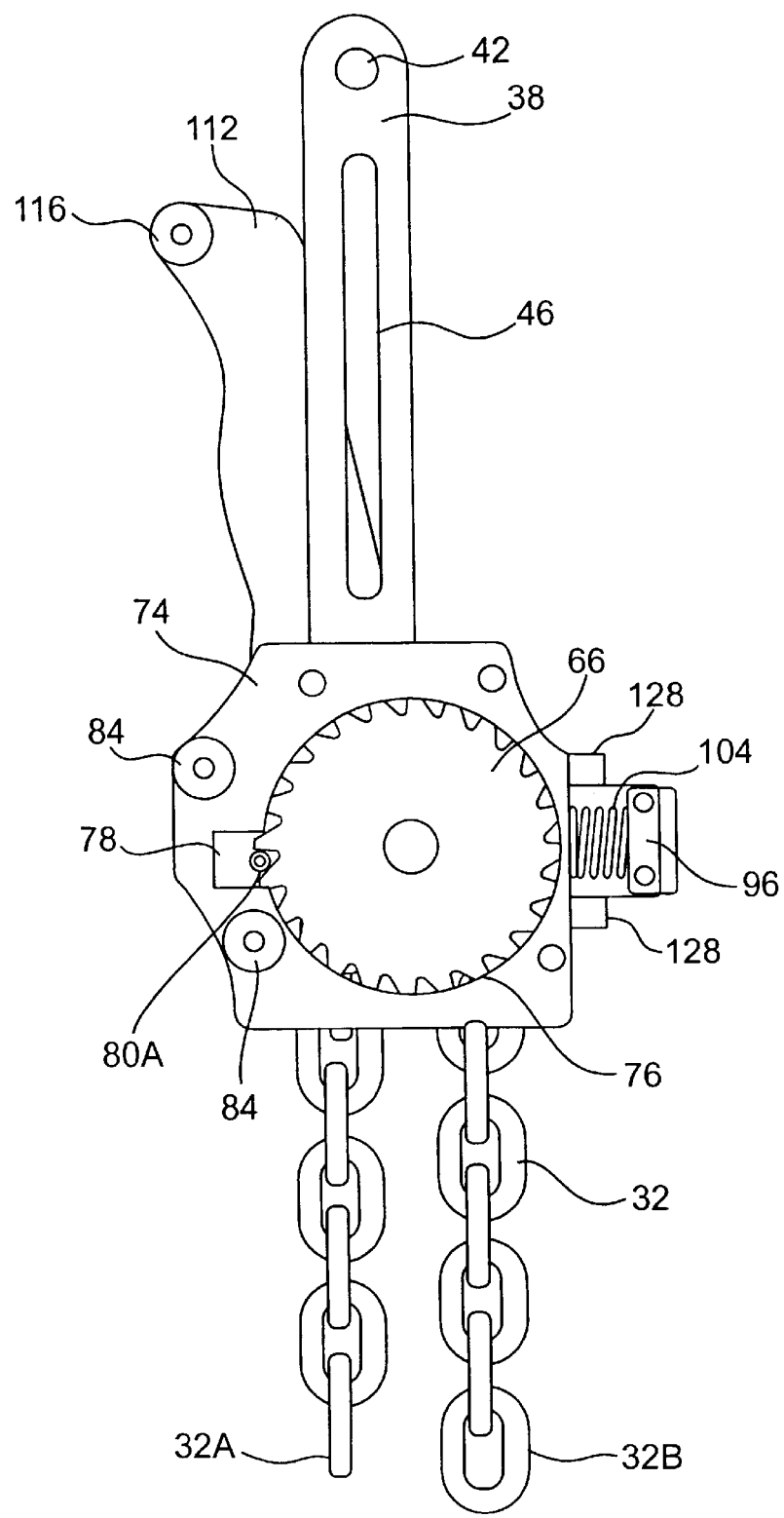
FIG. 11 is a side view of the restraint device of the present invention with an end plate and release slider removed with the release handle in the secured position.

The release handle 110 is actuated by moving it towards the load attachment member 38. As the release elements 112, 114 pivot about the pivot pin 119, the release sliders 86, 88 are moved linearly against the biasing force of the spring 104 acting on the release plate 96. As the release sliders 86, 88 are moved, the edges of the first slots 92 simultaneously come into contact with the pawl 80A. Further motion of the release sliders 86, 88 causes the pawl 80A to move away from the ratchet axle 54, and out of contact with the ratchet teeth 70. In this position the pawl 80A is accommodated in the cutouts 78 in the support plates 72, 74, shown in FIGS. 2, 7, 11, and 12. With the pawl 80A disengaged from the ratchet teeth 70, the ratchet wheels 64, 66 are free to rotate in both the first and the second directions. The release handle 110 is shown in the secured position in FIG. 11, and the released position in FIG. 12.

A locking device can be used to prevent unintentional actuation of the release handle 110. Such a device can be secured through the central slot 46 of the load attachment member 38 to prevent movement of the release handle 110 relative to the load attachment member 38.

The process of securing a load using the restraint device 30 of the present invention will now be described. The description will be provided with reference to the use of a chain as a securing line, but it is envisioned that other types of securing lines could also be used.

First, the load attachment member 38 is attached to the load to be restrained. The load attachment member 38 may be configured with a hook 44 in the mounting orifice 42, as shown in FIG. 1. The hook 44 may be used to engage a load chain or, alternatively, the hook 44 may be connected directly to a mounting surface on the load.

Next, a first end 32A of the tensioning chain 32 is secured to the support surface, and a second end 32B of the chain 32 is guided around the line support member 48. To guide the chain 32, the release handle 110 must be actuated to move the pawl 80A out of engagement with the ratchet teeth 70, thereby increasing the available area for placement of the chain 32 around the chain bed 68. With the release handle 110 actuated, the second end 32B of the tensioning chain 32 is manually guided over the chain bed 68. As the chain 32 is pulled through the line support member 48, the chain links will automatically seat in the shaped recesses of the chain bed 68. Once the second end 32B of the tensioning chain 32 has been pulled clear of the line support member 48, the release handle 110 can be freed.

Freeing the release handle 110 causes the pawl 80A to move under the biasing force of the spring 104 back into engagement with the ratchet teeth 70 of the ratchet wheels 64, 66. With the pawl 80A in the engaged position shown in FIG. 11, the line support member 48 can turn freely in the first direction to allow the chain 32 to be tightened. As the ratchet wheels 64, 66 turn in the first direction, the pawl 80A rides over the curved outer surfaces of the ratchet teeth 70. If the ratchet wheels 64, 66 begin to turn in the second direction to allow the chain 32 to loosen, however, the pawl 80A will catch on the curved inner surfaces of the ratchet teeth 70 and prevent rotation of the ratchet wheels 64, 66.

A restraining force can now be applied to the load by pulling the second end 32B of the tensioning chain 32 either by hand, or with the aid of a mechanical device, such as a crank. As the second end 32B of the tensioning chain 32 is pulled, tension is developed in the length of chain 32 between the restraint device 30 and the support surface.

Relative motion between the chain 32 and the chain bed 68 of the ratchet member 48 is prevented by the interaction of the individual chain links with the machined recesses 71 in the chain bed 68, shown in FIG. 5.

Figure 12:
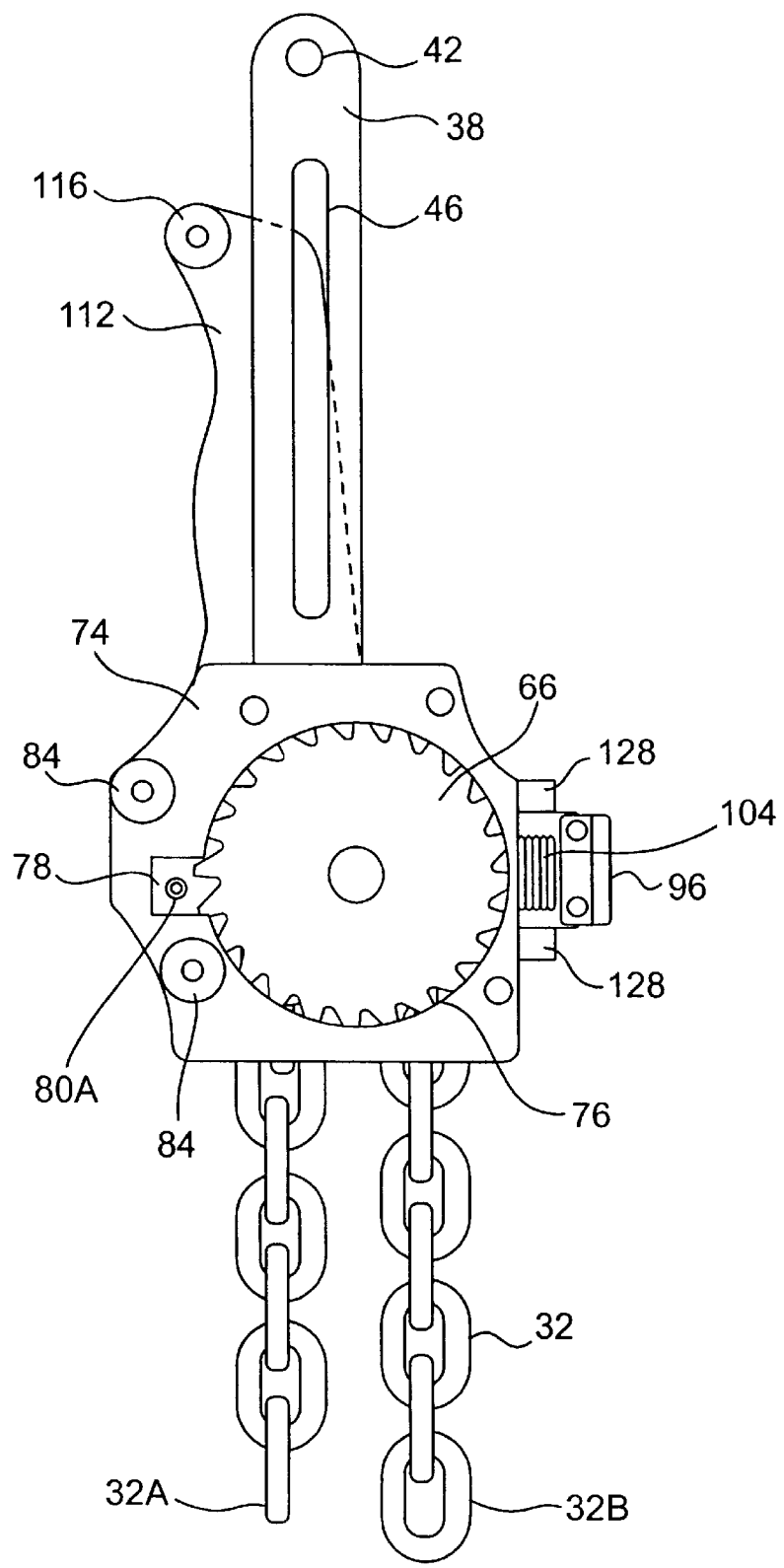
FIG. 12 is a side view of the restraint device of the present invention with an end plate and release slider removed with the release handle in the released position.

To remove the restraining force from the load, the release handle 110 is actuated. Pulling the release handle 110 moves the release sliders 86, 88 against the biasing force of the spring 104. An edge of the first slot 92 on each release slider 86, 88 simultaneously contacts the pawl 80A, and moves the pawl 80A out of engagement with the ratchet teeth 70, as shown in FIG. 12. Once out of engagement, the pawl 80A no longer restrains the rotation of the ratchet wheels 64, 66. Urged by the tension in the tensioning chain 32, the ratchet wheels 64, 66 rotate in the second direction, dissipating the tension in the chain 32.

At higher chain tension levels, the release handle 110 may resist actuation due to higher loads exerted on the pawl 80A by the ratchet wheels 64, 66. In such instances, pressure can be applied directly to the release plate 96 to add to the force on the pawl 80A, taking it out of engagement with the ratchet teeth 70. Further, in an emergency situation, a blow can be applied to the release plate 96, as with a hammer, to effectuate an immediate release of the chain tension.

Figure 13:
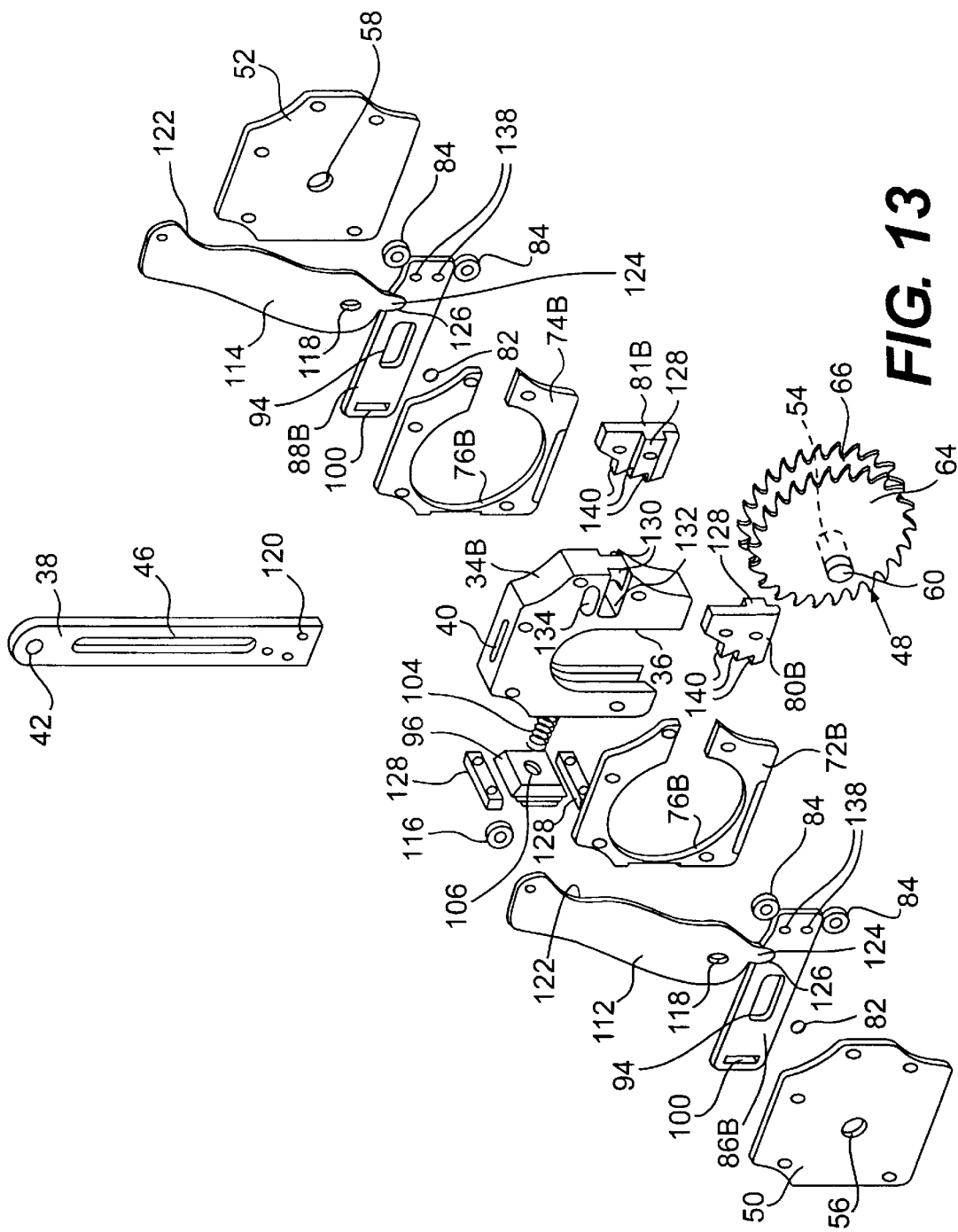
FIG. 13 is an exploded view of another embodiment of the restraint device of the present invention.
Figure 14:
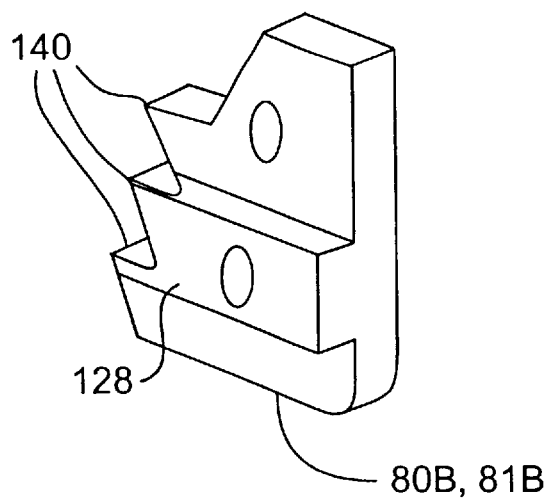
FIG. 14 is a detail view of the toothed latch of the present invention.
Figure 15:
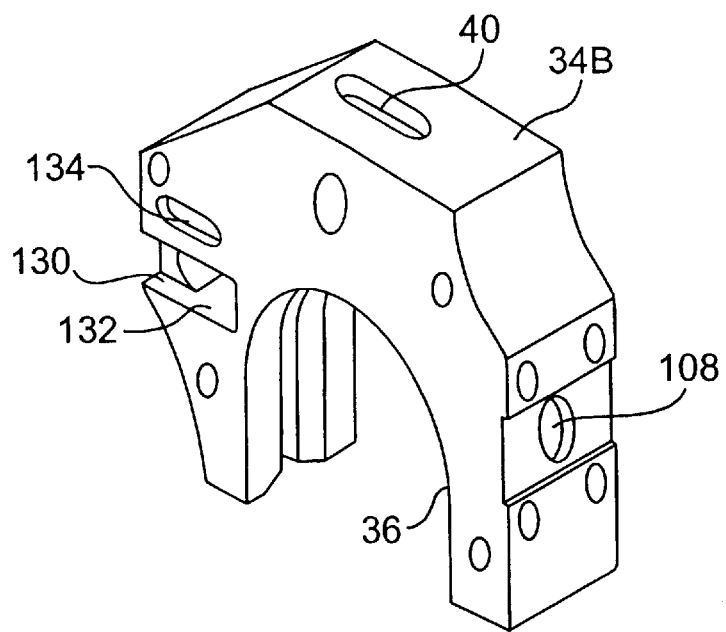
FIG. 15 is a detail view of another embodiment of the support frame of the present invention.

In another embodiment, the retention member 80 comprises a pair of toothed latches 80B, 81B. A retention member incorporating latches is shown in FIG. 13 and an individual latch is shown in FIG. 14. The restraint device 30 incorporating the toothed latches 80B, 81B also utilizes another embodiment of the support frame 34B, support plates 72B, 74B, and release sliders 86B, 88B, shown in FIGS. 15, 16, and 17, respectively.

Figure 18:
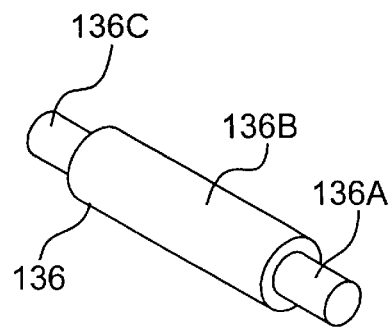
FIG. 18 is a detail view of a guide pin of the present invention.

In this embodiment, a latch 80B, 81B is arranged on either side of the support frame 34B. Each latch 80B, 81B has a raised section 128 received in a corresponding recess 130 in the support frame 34B. The support frame 34B of this embodiment includes two slots 132, 134 for receiving respective guide pins 136, shown in FIG. 18. Each guide pin 136 has a first end 136A disposed in a first latch 80B, a central section 136B disposed in a respective slot 132, 134 in the support frame 34B, and a second end 136C disposed in a second latch 81B.

Figure 16:
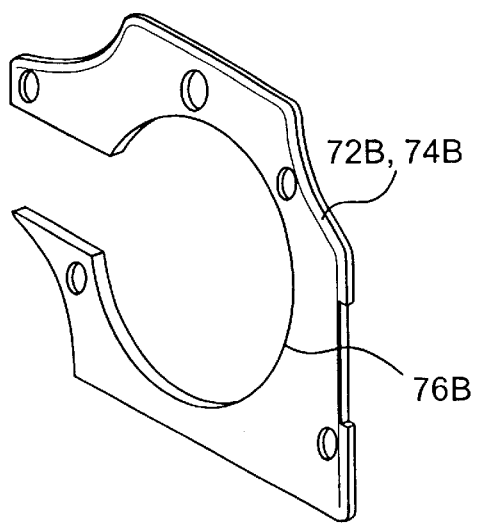
FIG. 16 is a detail view of another embodiment of the support plate of the present invention.

A support plate 72B, 74B is disposed on each side of the support frame 34B between the support frame 34B and a respective end plate 50, 52. The support plates 72B, 74B of this embodiment, shown in FIG. 16, are essentially C-shaped. Each support plate 72B, 74B has a central opening 76B with a portion of one edge removed to accommodate a respective latch 80B, 81B.

Figure 17:
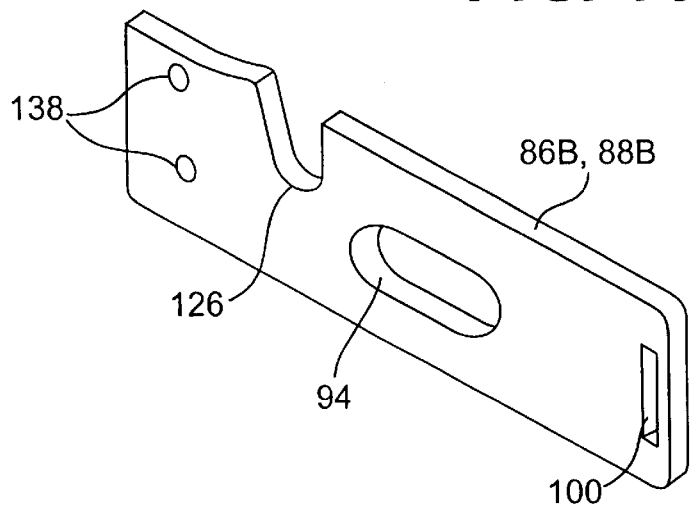
FIG. 17 is a detail view of another embodiment of the slider of the present invention.

The release sliders 86B, 88B of this embodiment, shown in FIG. 17, have two openings 138 at a first end to receive the guide pins 136 that support the latches 80B, 81B. Thus, the guide pins 136 extend outwardly of the latches 80B, 81B and pass through the openings 138 in the respective release sliders 86B, 88B. The end plates 50, 52 retain the guide pins 136 within the restraint device 30.

As in the above-described embodiment, the release sliders 86B, 88B have a central groove 94 to receive the hubs 60, 62 of the line support member 48, recesses 126 to receive the release cams 124 of the release elements 112, 114, and means for connecting the release sliders 86B, 88B to the release plate 96. FIG. 21 shows a slot 100 in the release member 86B, 88B for receiving a projection 102 on the release plate 96B. Other equivalent attachment means would perform equally well.

In operation, the restraint device 30 of this embodiment is first attached to a load to be secured, as described above. A tensioning chain 32 is then secured to a support surface and guided through the line support member 48. As in the above embodiment, the chain links will automatically seat in the shaped recesses 71 of the chain bed 68 as the chain 32 is pulled through the line support member 48.

Under the biasing force of the spring 104, the release plate 96 and sliders 86B, 88B are held in the first position. In this position, the teeth 140 on the latches 80B 81B are engaged with the teeth 70 on respective ratchet wheels 64, 66. In this engaged position, the ratchet wheels 64, 66 can turn freely in the first direction to allow the chain 32 to be tightened. As the ratchet wheels 64, 66 turn in the first direction, the curved outer surfaces of the latch teeth 140 ride over the curved outer surfaces of the ratchet teeth 70. If the ratchet wheels 64, 66 begin to turn in the second direction to allow the chain 32 to loosen, however, the curved inner surfaces of the latch teeth 140 will catch on the curved inner surfaces of the ratchet teeth 70 and prevent rotation of the ratchet wheels 64, 66.

A restraining force can now be applied to the load by pulling the second end 32B of the tensioning chain 32 either by hand, or with the aid of a mechanical device, such as a crank. As the second end 32B of the tensioning chain 32 is pulled, tension is developed in the length of chain between the restraint device 30 and the support surface.

Relative motion between the chain 32 and the chain bed 68 of the line support member 48 is prevented by the interaction of the individual chain links with the machined recesses 71 in the chain bed 68 shown in FIG. 5.

To remove the restraining force from the load, the release handle 110 is actuated. Pulling the release handle 110 moves the release sliders 86B, 88B against the biasing force of the spring 104. As the sliders 86B, 88B move to the second position, the teeth 140 of the latches 80B, 81B are moved out of engagement with the ratchet teeth 70. Once out of engagement, the latch teeth 140 no longer restrain the rotation of the ratchet wheels 64, 66. Urged by the tension in the tensioning chain 32, the ratchet wheels 64, 66 rotate in the second direction, dissipating the tension in the chain 32.

The restraint device 30 of the present invention can be made from 2024 aircraft aluminum, or other materials of sufficient strength.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A restraint device, comprising:
    a frame;
    a load attachment member secured to the frame;
    a line support member rotatably supported on the frame;
    a retention member engageable with the line support member to prevent rotation of the line support member in one direction; and
    a release member for controlling the engagement of the retention member with the line support member, the release member comprising:
        at least one sliding element supporting the retention member, the at least one sliding element comprising a recess, wherein the at least one sliding element is movable between a first position, in which the retention member is engaged with the line support member, and a second position, in which the retention member is disengaged from the line support member; and
        a movable release element comprising at least one cam surface interacting with a corresponding recess on the at least one sliding element, such that moving the release element causes the at least one sliding element to move between the first position and the second position.

2. The restraint device of claim 1, wherein the release member is pivotable with respect to the frame.

3. The restraint device of claim 1, wherein the at least one sliding element is biased to the first position.

4. The restraint device of claim 1, wherein the line support member comprises at least one toothed wheel associated with a line-engaging surface.

5. The restraint device of claim 4, wherein the line-engaging surface comprises a hub with a plurality of surfaces, each surface having a feature corresponding to a contour of a tensioning line, wherein the feature is adapted to engage the tensioning line to prevent relative motion between the tensioning line and the hub.

6. The restraint device of claim 5, wherein the feature is a recess shaped to receive a chain link.

7. The restraint device of claim 4, wherein the retention member comprises a retention element engageable with the at least one toothed wheel.

8. The restraint device of claim 7, wherein the retention element comprises a substantially cylindrical pawl.

9. The restraint device of claim 7, wherein the retention element comprises a toothed latch.

10. A restraint device for releasably securing a load, the restraint device comprising:
    a frame;
    a load attachment member disposed on the frame adapted to engage the load;
    a line support member disposed on the frame adapted to support a tensioning line, the line support member comprising a plurality of toothed wheels and a hub secured to the toothed wheels, the hub having a line-engaging surface, wherein the line support member is rotatable in a first direction and a second direction;

a retention member engageable with the plurality of toothed wheels to prevent rotation of the line support member in the second direction; and a release member actuable to move the retention member into and out of engagement with the line support member, wherein the release member is biased to place the retention member in engagement with the line support member.

11. The restraint device of claim 10, wherein the release member comprises:

a plurality of sliding elements supporting the retention member; and a movable release handle in contact with the sliding elements, whereby the release member is actuated by moving the release handle.

12. The restraint device of claim 10, wherein the line-engaging surface is adapted to engage the tensioning line and prevent relative motion between the tensioning line and the hub.

13. The restraint device of claim 12, wherein the line-engaging surface is a chain-shaped recess and the hub is adapted to engage a chain.

14. The restraint device of claim 10, wherein the retention member comprises a retention element engageable with the teeth of the plurality of toothed wheels.

15. The restraint device of claim 14, wherein the retention element comprises a substantially cylindrical pawl.

16. The restraint device of claim 14, wherein the retention element comprises a plurality of toothed latches engageable with respective toothed wheels.

17. A restraint device for releasably securing a load by creating a force in a tensioning line extending between a support surface and the load, the restraint device comprising:

a frame;

a load attachment member secured to the frame adapted to engage the load;

a line support member supported on the frame adapted to support the tensioning line, the line support member comprising a multifaceted chain bed having a chain retention surface and first and second toothed ratchet wheels disposed on corresponding end surfaces of the chain bed, wherein the line support member is rotatable in a tightening direction and a loosening direction;

a retention member engageable with the line support member to prevent rotation of the line support member in the loosening direction; and a release member supporting the retention member, wherein the release member is movable between a first position, in which the retention member engages the line support member, and a second position, in which the retention member disengages from the line support member.

18. The restraint device of claim 17, wherein the chain retention surface comprises a series of recesses corresponding in shape to links of a chain, such that the recesses are adapted to prevent motion of the chain with respect to the chain bed.

19. A restraint device for releasably securing a load by creating a force in a tensioning line extending between a support surface and the load, the restraint device comprising:

a frame;

a load attachment member secured to the frame adapted to engage the load;

a line support member supported on the frame adapted to support the tensioning line, wherein the line support member is rotatable in a tightening direction and a loosening direction;

a retention member engageable with the line support member to prevent rotation of the line support member in the loosening direction; and a release member supporting the retention member, the release member comprising a plurality of sliders in contact with the retention member and a pivotable release handle in contact with the sliders, such that pivoting the release handle moves the sliders between a first position, in which the retention member engages the line support member, and a second position, in which the retention member disengages from the line support member.

20. The restraint device of claim 19, wherein the release member is biased to the first position.

21. The restraint device of claim 19, wherein the line support member comprises a pair of toothed ratchet wheels.

22. The restraint device of claim 21, wherein the retention member comprises a substantially cylindrical pawl engageable with the teeth of both ratchet wheels.

23. The restraint device of claim 21, wherein the retention member comprises a pair of toothed latches, each latch engageable with the teeth of a respective ratchet wheel.

24. The restraint device of claim 19, wherein the release member comprises two sliders on opposite sides of the frame, each slider having a first end contacting the retention member and a second end secured to a release plate.

25. The restraint device of claim 24, further comprising an elastic element disposed between the release plate and the frame to bias the release member to the first position.

* * * * *